(12) United States Patent
Grimaldi et al.

(10) Patent No.: US 8,191,053 B2
(45) Date of Patent: May 29, 2012

(54) COMPUTERIZED DATA WAREHOUSING

(75) Inventors: Nancy Grimaldi, Ellington, CT (US); Dee Goldschmidt, New York, NY (US)

(73) Assignee: Ingenix, Inc., Eden Prairie, MN (US)

(*) Notice: Subject to any disclaimer, the term of this patent is extended or adjusted under 35 U.S.C. 154(b) by 1060 days.

(21) Appl. No.: 12/027,622

(22) Filed: Feb. 7, 2008

(65) Prior Publication Data

US 2008/0256523 A1 Oct. 16, 2008

Related U.S. Application Data

(60) Provisional application No. 60/911,328, filed on Apr. 12, 2007.

(51) Int. Cl.
*G06F 17/00* (2006.01)
*G06F 17/30* (2006.01)
*G06F 15/00* (2006.01)
*G06F 17/20* (2006.01)
*G06F 9/45* (2006.01)

(52) U.S. Cl. ........ 717/141; 707/602; 707/756; 707/760; 708/204; 715/249; 717/136; 717/137

(58) Field of Classification Search .................. None
See application file for complete search history.

(56) References Cited

U.S. PATENT DOCUMENTS

| | | | | |
|---|---|---|---|---|
| 5,253,164 A | 10/1993 | Holloway et al. | ............. | 364/406 |
| 5,359,509 A | 10/1994 | Little et al. | .................... | 364/401 |
| 5,557,514 A | 9/1996 | Seare et al. | .................... | 364/401 |
| 5,640,550 A * | 6/1997 | Coker | ........................... | 717/141 |
| 5,724,488 A | 3/1998 | Prezioso | ......................... | 395/61 |
| 5,819,226 A | 10/1998 | Gopinathan et al. | ............. | 705/1 |
| 5,878,422 A * | 3/1999 | Roth et al. | .................... | 717/136 |
| 6,038,388 A | 3/2000 | Hogden et al. | ........... | 395/500.27 |
| 6,223,164 B1 | 4/2001 | Seare | ................ | 705/2 |
| 6,253,186 B1 | 6/2001 | Pendleton, Jr. | ................... | 705/2 |
| 6,341,265 B1 | 1/2002 | Provost et al. | ................ | 705/4 |
| 6,343,271 B1 | 1/2002 | Peterson et al. | ................. | 705/4 |
| 6,453,464 B1 * | 9/2002 | Sullivan | ........................ | 717/141 |
| 6,714,918 B2 | 3/2004 | Hillmer et al. | .................. | 705/18 |

(Continued)

FOREIGN PATENT DOCUMENTS

WO  WO 00/35341  6/2000

(Continued)

OTHER PUBLICATIONS

Jonathan C. Prather et al., Converting a Legacy System Database into Relational Format to Enhance Query Efficiency, 1995, [Retreived on Feb. 14, 2012]. Retrieved from the internet: <URL: http://www.ncbi.nlm.nih.gov/pmc/articles/PMC2579117/pdf/procascamc00009-0401.pdf> 5 pages (372-376).*

(Continued)

*Primary Examiner* — Thuy Dao
*Assistant Examiner* — Anibal Rivera
(74) *Attorney, Agent, or Firm* — Fulbright & Jaworski L.L.P.

(57) ABSTRACT

A system and method for transforming data from a first format to a second format. A pre-existing set of software instructions may be used to transform the data from the first format to the second format. A user may document a set of format parameters for the first format of data, which can be used to determine which portion of the pre-existing software instructions are used to transform the data from the first format to the second format.

23 Claims, 4 Drawing Sheets

U.S. PATENT DOCUMENTS

| | | | | |
|---|---|---|---|---|
| 6,721,752 | B1* | 4/2004 | Kislanko | 717/143 |
| 6,782,371 | B2 | 8/2004 | Thompson et al. | 705/10 |
| 6,826,536 | B1 | 11/2004 | Forman | 705/4 |
| 6,826,537 | B1 | 11/2004 | Wood et al. | 705/4 |
| 6,915,265 | B1 | 7/2005 | Johnson | 705/2 |
| 7,002,468 | B2 | 2/2006 | Eveland | 340/539.12 |
| 7,047,204 | B1 | 5/2006 | Wood et al. | 705/4 |
| 7,058,585 | B1 | 6/2006 | Wood et al. | 705/4 |
| 7,089,592 | B2 | 8/2006 | Adjaoute | 726/25 |
| 7,209,886 | B2 | 4/2007 | Kimmel | 705/2 |
| 7,350,199 | B2* | 3/2008 | Ito et al. | 717/137 |
| 7,430,656 | B2* | 9/2008 | Sperber et al. | 708/204 |
| 7,493,555 | B2* | 2/2009 | Costa et al. | 715/249 |
| 7,779,398 | B2* | 8/2010 | Tjong et al. | 717/141 |
| 7,836,063 | B2* | 11/2010 | Salazar et al. | 707/760 |
| 7,877,421 | B2* | 1/2011 | Berger et al. | 707/602 |
| 7,970,779 | B2* | 6/2011 | Smirnov et al. | 707/756 |
| 2001/0041993 | A1 | 11/2001 | Campbell | 705/4 |
| 2002/0019754 | A1 | 2/2002 | Peterson et al. | 707/104.1 |
| 2002/0103680 | A1 | 8/2002 | Newman | 705/4 |
| 2002/0138306 | A1 | 9/2002 | Sabovich | 705/3 |
| 2003/0078815 | A1* | 4/2003 | Parsons | 705/4 |
| 2003/0135397 | A1 | 7/2003 | Halow | 705/4 |
| 2003/0149594 | A1 | 8/2003 | Beazley et al. | 705/4 |
| 2003/0158751 | A1 | 8/2003 | Suresh et al. | 705/10 |
| 2003/0167190 | A1 | 9/2003 | Rincavage et al. | 705/3 |
| 2003/0191665 | A1 | 10/2003 | Fitzgerald et al. | 705/2 |
| 2003/0191667 | A1 | 10/2003 | Fitzgerald et al. | 705/4 |
| 2003/0229519 | A1 | 12/2003 | Eidex et al. | 705/2 |
| 2004/0015564 | A1* | 1/2004 | Williams | 709/219 |
| 2004/0059604 | A1* | 3/2004 | Zaleski | 705/2 |
| 2004/0078228 | A1 | 4/2004 | Fitzgerald et al. | 705/2 |
| 2004/0084895 | A1 | 5/2004 | Blum | 705/4 |
| 2005/0044357 | A1 | 2/2005 | Fano | 705/2 |
| 2005/0086179 | A1 | 4/2005 | Mehmet | 705/80 |
| 2005/0097051 | A1 | 5/2005 | Madill et al. | 705/500 |
| 2005/0108063 | A1 | 5/2005 | Madill et al. | 705/4 |
| 2005/0137912 | A1 | 6/2005 | Rao et al. | 705/4 |
| 2005/0192844 | A1* | 9/2005 | Esler et al. | 705/3 |
| 2005/0203867 | A1* | 9/2005 | Judd et al. | 707/1 |
| 2005/0273442 | A1 | 12/2005 | Bennett et al. | 705/67 |
| 2005/0276401 | A1 | 12/2005 | Madill et al. | 705/4 |
| 2006/0010007 | A1 | 1/2006 | Denman et al. | 705/2 |
| 2006/0085230 | A1 | 4/2006 | Brill et al. | 705/2 |
| 2006/0098849 | A1 | 5/2006 | Woodward | 382/124 |
| 2007/0016450 | A1* | 1/2007 | Bhora et al. | 705/3 |
| 2008/0005667 | A1* | 1/2008 | Dias et al. | 715/523 |

FOREIGN PATENT DOCUMENTS

| | | |
|---|---|---|
| WO | WO 01/13295 | 2/2001 |
| WO | WO 01/24040 | 4/2001 |
| WO | WO 02/21313 | 3/2002 |
| WO | WO 02/25559 | 3/2002 |
| WO | WO 02/35410 | 5/2002 |
| WO | WO 03/071380 | 8/2003 |
| WO | WO 03/071388 | 8/2003 |

OTHER PUBLICATIONS

Vagelis Hristidis et al., A Flexible Approach for Electronic Medical Records Exchange, 2006, ACM 1-59593-528-02/06/0011, [Retrieved on Feb. 14, 2012]. Retrieved from the internet: <URL: http://delivery.acm.org/10.1145/1190000/1183576/p33-hristidis.pdf> 8 pages (33-40).*

Stefan Jablonski et al., Process based Data Logistics: a Solution for Clinical Integration Problems, 2004, LNBI 2994, [Retrieved on Feb. 14, 2012]. Retrieved from the internet: <URL: http://www.springerlink.com/content/bdf915v9gukhfl7t/fulltext.pdf> 16 Pages (31-46).*

Lisella, U.S. Appl. No. 11/675,347, entitled "System and Method for Automated Quality Processing of Data," filed Feb. 15, 2007.

* cited by examiner

COMPUTERIZED DATA WAREHOUSING

CROSS-REFERENCE TO RELATED APPLICATIONS

This application claims the priority of U.S. Provisional Patent Application Ser. No. 60/911,328, filed Apr. 12, 2007, the entire disclosure of which is specifically incorporated herein by reference.

BACKGROUND INFORMATION

1. Field of the Invention

Exemplary embodiments of the present invention relate generally to data format transformation and data warehousing. More particularly, exemplary embodiments of the present invention concern software and other computer-related aspects of data format transformation and data warehousing.

2. Description of Related Art

The process of data warehousing involves storing data in databases or warehouses that allow the data to be accessed for various purposes, including analysis and generation of reports. The data is typically received from various sources without a standardized format. For example data regarding date information may be provided in the form of month, day, and year or in the format of day, month, and year. The year may be formatted as a two digit number or as a four digit number. Other examples of non-standardized data formats include data pertaining to names; e.g., the names may be formatted as last name first or as first name last.

The existence of different formats for equivalent data presents challenges to a user who wishes to access a data warehouse for analysis, calculation, or other purposes. It is therefore desirable to transform the data format to a known or standardized format. With the data in a known format, a user can more easily access the data in the data warehouse for analysis, calculation, report generation, etc. For example, if the data is in a known format, it may be accessed via automated processes, such as computer-generated queries.

A user may also use automated processes, including computer software programs, to transform data into a known format. Typically, such transformations require several individuals to be involved, including subject matter experts on the source data, subject matter experts on the target data store, and computer programmers to examine the original format and content of the data and compare it against the desired data format and content. The team involved can then produce appropriate transformation rules and the programmer can then generate software code that can be used to transform the data from its original format to a standardized format, which allows for simpler or more streamlined data access. However, the process of transforming the data can be labor-intensive, requiring the subject matter experts and programmers to inspect the incoming data and write software needed to transform the data to a standardized format. Each time data is received from a source, a similar team is needed to review the format and generate the appropriate code.

Although relying on traditional techniques may provide suitable results, they are not ideal and leave room for improvement. For example, traditional techniques can be significantly improved by providing techniques that allow one to, e.g., implement data transformation techniques that can be run efficiently, repeatedly, and accurately by users with little or no specialized knowledge of computer software programming. Providing techniques that allow a user to access pre-existing software utilized in the transformation would also represent a significant improvement.

Referenced shortcomings of conventional methodologies mentioned above are not intended to be exhaustive, but rather are among several that tend to impair the effectiveness of previously known techniques concerning data integration and data format transformation. Other noteworthy problems may also exist; however, those mentioned here are sufficient to demonstrate that methodology appearing in the art has not been altogether satisfactory and that a significant need exists for the techniques described and claimed here.

SUMMARY OF THE INVENTION

Certain shortcomings of the prior art are reduced or eliminated by techniques disclosed here. These techniques are applicable to a vast number of applications, including but not limited to any application involving data integration, data format transformation or data warehousing. These techniques may be implemented in hardware (e.g., a system including a suitably-configured computer), software (implemented on any of a host of media known in the art), as a method, or as otherwise understood by those having ordinary skill in the art. The summary below is focused on inventive techniques implemented in a system or method, with the understanding that other analogous implementations are contemplated, such as software.

Certain aspects of the invention may involve a method of transforming data. The method may comprise receiving a first plurality of data in a first format and documenting a first set of format parameters for the first format. The method may also comprise accessing a set of pre-existing software instructions and utilizing a first portion of the pre-existing software instructions to transform the first plurality of data to a second format. The first portion of the pre-existing software instructions may be selected based on the first set of format parameters. The method may also involve storing the first plurality of data in the second format.

In other aspects, the invention may comprise performing calculations with the first plurality of data in the first format before storing the first plurality of data in the second format. In certain aspects, the calculations may comprise calculating an age of a person. In other aspects the calculations may comprise other calculations, such as derived dollar amounts or risk factors. A subset of the first plurality of data may be validated for a desired transformation from the first format to the second format and the first plurality of data in the second format may be stored in a data warehouse. This validation may occur before the entire first plurality of data is transformed to the second format.

In still other aspects, the invention may comprise a method for generating reports from the first plurality of data in the second format. In other aspects, the invention may comprise a method in which a portion of the pre-existing software instructions converts a plurality of data into a flat file of commonized data before transforming the plurality of data to a second format.

In still other aspects, the invention may comprise a method for receiving a second plurality of data in a third format, documenting a second set of format parameters for the third format and accessing the set of pre-existing software instructions. In certain aspects a second portion of the pre-existing software instructions may be utilized to transform the second plurality of data to a fourth format. The second portion of the pre-existing software instructions may be selected based on the second set of format parameters. In certain aspects, the invention may comprise storing the second plurality of data in the fourth format.

In certain aspects, the invention may comprise a method in which the first plurality of data in the first format is received via a computer, which may be connected to the internet. In other aspects, the first plurality of data in the first format is received via a hand-held electronic device. In other aspects, the data is received via a secured file transfer arrangement from the source to an assigned target device. The first plurality of data can be received in many formats, as the invention is able to transform it into a desirable second format.

In certain aspects, the invention may comprise a system for transforming data from a first format to a second format in which the system is configured to receive a first plurality of data in a first format; receive from a user a documentation of a first set of format parameters for the first format; access a set of pre-existing software instructions; and utilize a first portion of the pre-existing software instructions to transform the first plurality of data to a second format. In certain aspects, the first portion of the pre-existing software instructions may be selected based on the first set of format parameters, and the system may store the first plurality of data in the second format.

In other aspects, the invention may comprise a system configured to perform calculations with the first plurality of data in the first format before storing the first plurality of data in the second format. In still other aspects, the invention may comprise a system configured to validate a desired transformation of a subset of the first plurality of data before transforming the data from the first format to the second format.

DETAILED DESCRIPTION OF ILLUSTRATIVE EMBODIMENTS

The computerized data format transformation and data warehousing techniques of this disclosure can be efficiently applied to a system that allows data in several different formats to be transformed into a standardized format and stored in a data warehouse.

Figure 1:
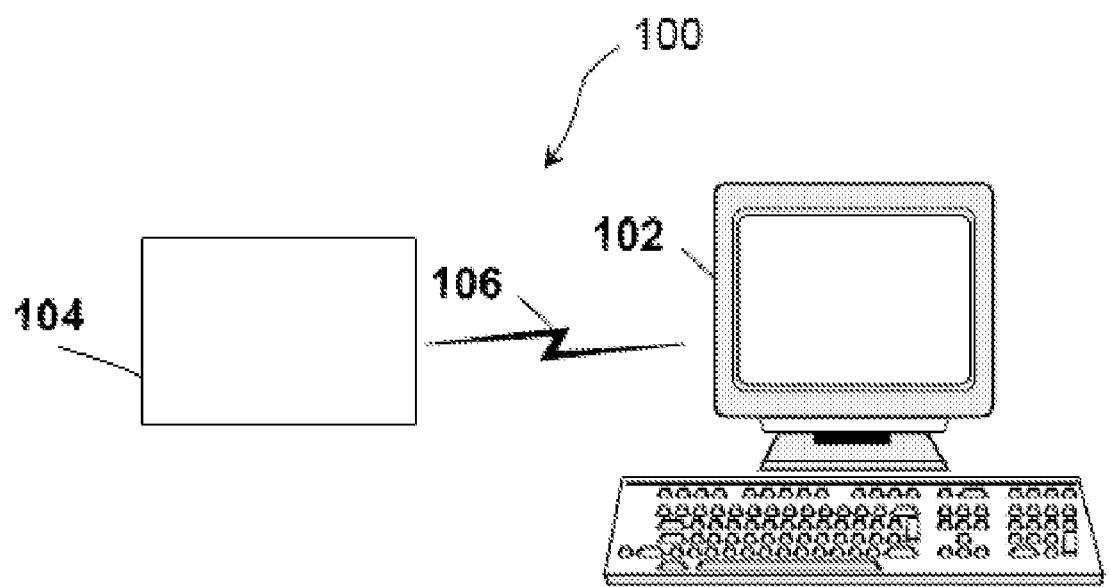
FIG. 1 is a schematic diagram of a data transformation and warehousing system, in accordance with embodiments of this disclosure.

FIG. 1 is a schematic diagram of a data transformation and warehousing system 100, in accordance with embodiments of this disclosure. FIG. 1 shows a data retrieval apparatus 104 coupled to computer 102 via connection 106. Data retrieval apparatus 104 may be, in one embodiment, another computer. In another embodiment apparatus 104 may represent a file of data residing in a server environment available via network connection to computer 102. In other embodiments, it may be integral to computer 102. In such an embodiment, connection 106 may be an internal connection.

Connection 106 is meant to indicate any connection suitable for allowing computer 102 to communicate with data retrieval apparatus 104. In one embodiment, data retrieval apparatus 106 is a wired connection. In another embodiment, connection 106 is wireless. In certain embodiments, connection 106 may be a network connection over a network such as the Internet or an internal network within an organization. Such an embodiment allows for remote control of data retrieval apparatus 104 from virtually any computer in the world connected to the network.

Computer 102 is meant to indicate any computing device capable of executing instructions for controlling one or more aspects of data retrieval apparatus 104. In one embodiment, computer 102 is a personal computer (e.g., a typical desktop or laptop computer operated by a user) with network access. In another embodiment, computer 102 may be a handheld computing device. In another embodiment, computer 102 and data retrieval apparatus 104 may be integral, and in such embodiment, computer 102 may simply constitute one or more boards (e.g., a motherboard including a processor) among other electronic boards and equipment.

Computer 102 can be a networked device and may constitute a terminal running software from a remote server, wired or wirelessly. Input from a user may be gathered through one or more known techniques such as a keyboard and/or mouse. Output, if necessary, can be achieved through one or more known techniques such as an output file, printer, facsimile, e-mail, web-posting, or the like. Storage can be achieved internally and/or externally and may include, for example, a hard drive, CD drive, DVD drive, tape drive, floppy drive, network drive, flash, or the like. Computer 102 may use any type of monitor or screen known in the art. For example, a cathode ray tube (CRT) or liquid crystal display (LCD) can be used. One or more display panels may also constitute a display. In other embodiments, a traditional display may not be required, and computer 102 may operate through appropriate voice and/or button commands.

Security associated with computer 102 can involve any techniques known in the art. Computer 102 may be associated with one or more biometric readers that only allow authorized personnel to operate the equipment. In other embodiments, user accounts and passwords may be used for the appropriate access. In yet other embodiments, security functionality may be disabled or not present.

Figure 2:
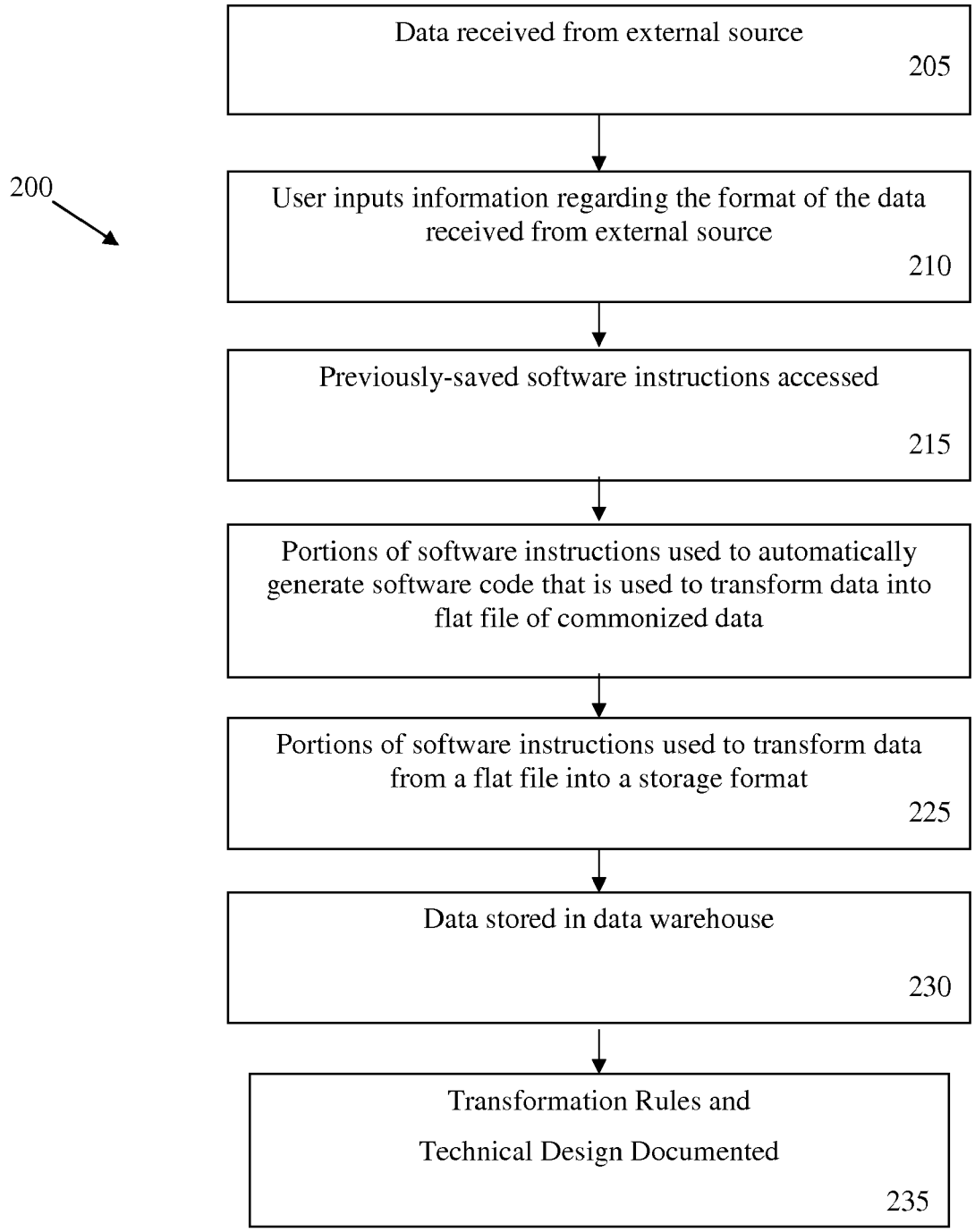
FIG. 2 is a flow chart showing steps of a data transformation and warehousing method, in accordance with embodiments of this disclosure.

FIG. 2 is a flow chart showing steps of a data transformation and warehousing method 200, in accordance with embodiments of this disclosure. It is understood that certain steps provided in FIG. 2 (as well as those in FIGS. 3-4) may be performed concurrently rather than consecutively. In certain embodiments, computer 102 of FIG. 1 is configured to implement the steps of FIG. 2. In general, an embodiment of method 200 allows a user, among other things, to transform the format of data received by data retrieval apparatus 104 easily, repeatedly, and efficiently using pre-existing software instructions. For example, instead of creating software instructions to transform the data format, a user can access previously-saved software instructions based on parameters defined by the user. The software instructions can transform the data to a known or standardized format.

In step 205, data is received from an external source. The user may then input information regarding the format parameters of the data that is received from the external source in step 210. For example, the user may input format information stating that the data contains dates in the format of month, day, and year, with the year being a two digit number. A set of previously-saved software instructions may be accessed in step 215 based on the data analysis performed in step 210. In certain embodiments, step 215 may be performed concurrently with step 210, so that as portions of the data format are entered, the previously-saved software instructions may be accessed. Based on the format parameters provided by the user, certain portions of the software instructions may be used to automatically generate software code that is used to transform the format of the data into a flat file of commonized data in step 220. Step 220 may also be done concurrently with other steps in the process. In step 225 portions of the software instructions may be used to transform data from a flat file into a storage format, where the data can be stored in a data warehouse as shown in step 230. The storage format can be a known format that allows data to be efficiently accessed for various functions, e.g., calculations, report generation, etc., via automated processes. In step 235, the transformation rules and technical design of the process can be documented. It is understood that step 235 may be performed concurrently with other steps in the process. In certain embodiments, the transformation rules and technical design of the process may be documented in the form of a flowchart.

Figure 3:
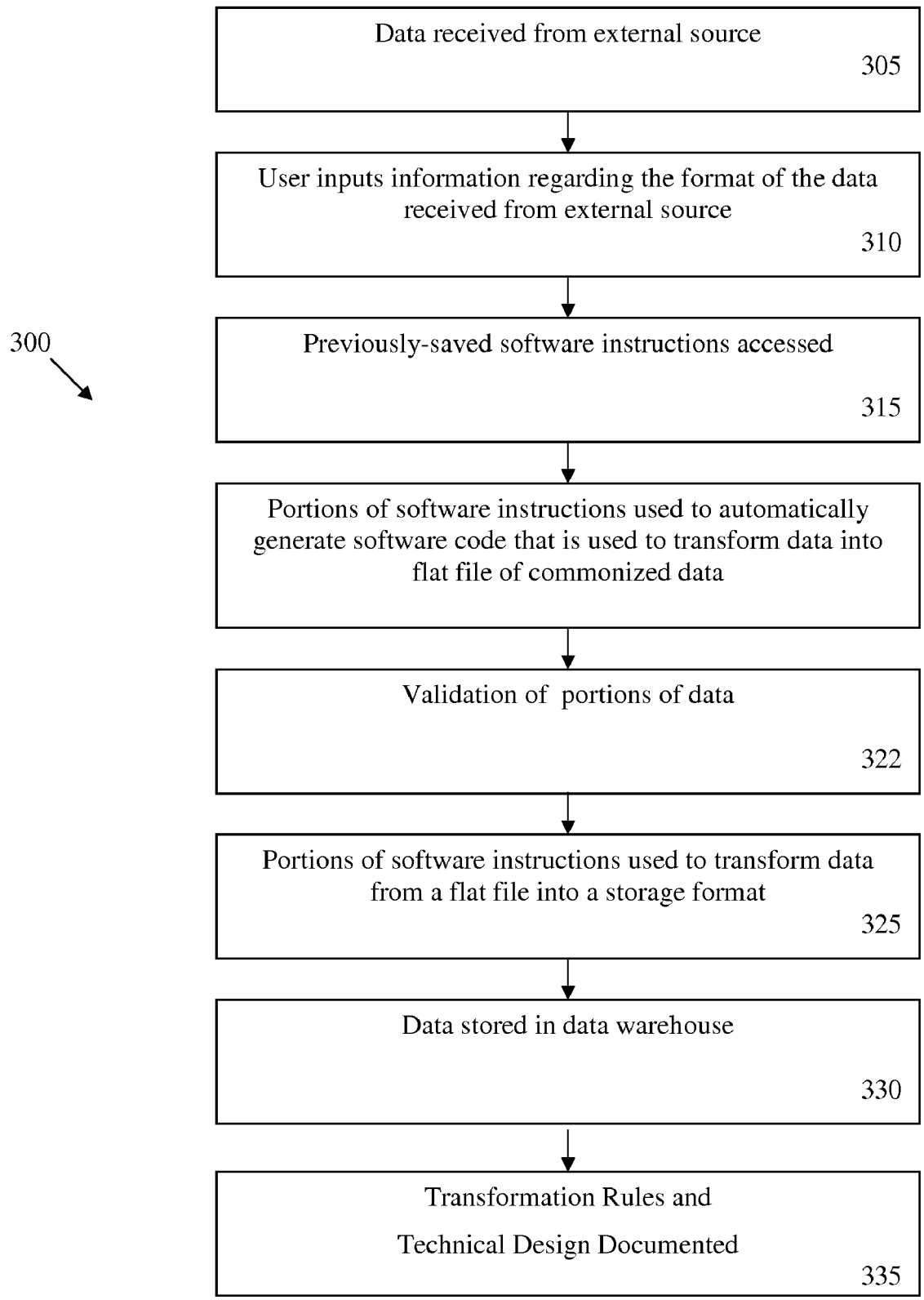
FIG. 3 is a flow chart showing steps of a data transformation and warehousing method, in accordance with embodiments of this disclosure.

In addition to the method described in FIG. 2, other illustrative embodiments may provide validation techniques on data that is received. As shown in FIG. 3, for example, data is received from an external source in step 305. The user may then input or document parameters regarding the format of the data that is received from the external source in step 310. For example, the user may input format information stating that the data contains dates in the format of day, month, and year, with the year being a four digit number and the day and month being two digit numbers. In step 315, a set of previously-saved software instructions may then be accessed based on the data analysis performed in step 310. In certain embodiments, step 315 may be performed concurrently with step 310, so that as portions of the data format are entered, the previously-saved software instructions may be accessed. Based on the format information provided by the user, certain portions of the software instructions may be used to automatically generate software code that is used to transform the format of the data into a flat file of commonized data in step 320. Step 320 may also be done concurrently with other steps in the process. In the embodiment shown in FIG. 3, validation of portions of the data can be performed in step 322 before all of the received data is transformed to the storage format in step 325. This can be accomplished by running tests on portions of the received data to determine if the format transformation is producing the desired output. If the tests produce the desired output, the transformation can be performed on the remaining received data, which may then be transformed from a flat file into a storage format where the data can be stored in a data warehouse in step 330. In step 335, the transformation rules and technical design of the process can be documented. It is understood that step 335 may be performed concurrently with other steps in the process. If errors are detected during the validation tests, then changes can be made to the software instructions or the documented format parameters in order to produce the desired results.

Figure 4:
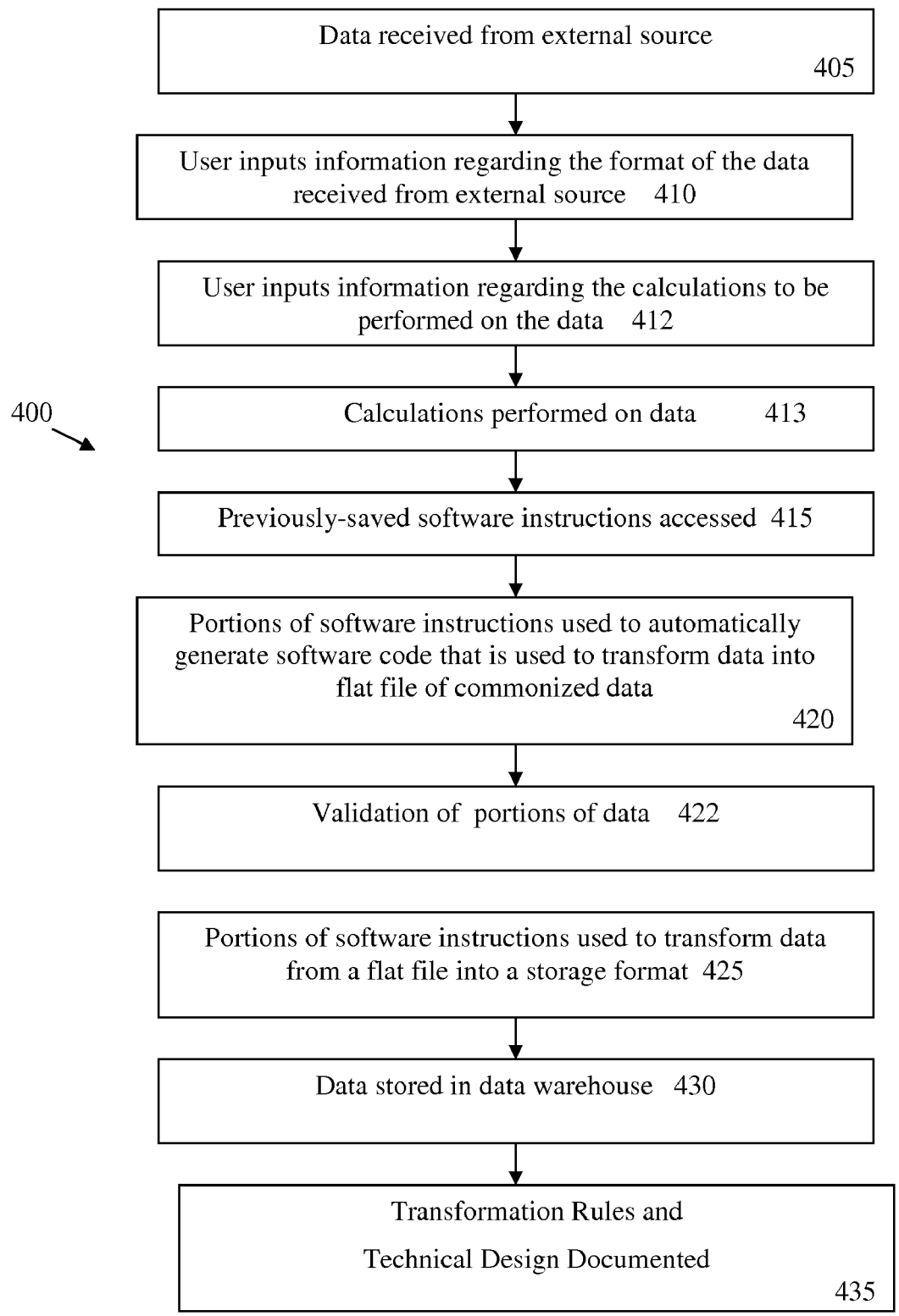
FIG. 4 is a flow chart showing steps of a data transformation and warehousing method, in accordance with embodiments of this disclosure.

In the embodiment shown in FIG. 4, calculations may also be performed on the received data before the data has been transformed into the storage format. For example, if the received data includes birth dates of individuals, the age of the individual may be calculated by subtracting the birth date from the current date. In the embodiment shown in FIG. 4, data is received from an external source in step 405. The user may then input information regarding the format of the data that is received from the external source in step 410. For example, the user may input format information stating that the birth dates in the format of day, month, and year, with the year being a four digit number and the day and month being two digit numbers. The user may also provide information regarding the calculations that are to be performed on the received data in step 412. In step 413, a set of previously-saved software instructions may then be accessed to perform the requested calculations on the data. In step 415, a set of previously-saved software instructions may then be accessed based on the data analysis performed in step 410. In certain embodiments, step 415 may be performed concurrently with step 410, so that as portions of the data format are entered, the previously-saved software instructions may be accessed. to transform the data to a standardized storage format. Based on the format information provided by the user, certain portions of the software instructions may be used to automatically generate software code that is used to transform the format of the data into a flat file of commonized data in step 420. In the embodiment shown in FIG. 4, validation of portions data can be performed in step 422 before all of the received data is transformed to the storage format in step 425. This can be accomplished by running tests on portions of the received data to validate the desired transformation from the first format to the second format. For example, the user may visually inspect a subset of the received data to confirm that the data has been properly transformed into the desired format without any modification to the underlying data. In other embodiments, the validation step may not be performed. If the tests produce the desired output, the transformation can be performed on the remaining received data, which may be transformed from a flat file into a storage format where the data can be stored in a data warehouse in step 430. In step 435, the transformation rules and technical design of the process can be documented. It is understood that step 435 may be performed concurrently with other steps in the process.

What is claimed is:

1. A method executed by a processor of transforming data, the method comprising:
   receiving a first plurality of data in a first format;
   documenting a first set of format parameters for the first format;
   accessing a set of pre-existing software instructions;
   utilizing a first portion of the pre-existing software instructions to transform the first plurality of data to a second format, wherein the first portion of the pre-existing software instructions is selected based on the first set of format parameters;
   validating a subset of the first plurality of data for a desired transformation from the first format to the second format;
   modifying the pre-existing software instructions if errors are detected during the validation; and
   storing the first plurality of data transformed by the modified pre-existing software instruction in the second format.

2. The method of claim 1, further comprising:
   performing calculations with the first plurality of data in the first format before storing the first plurality of data in the second format.

3. The method of claim 2 wherein performing calculations with the first plurality of data in the first format comprises calculating an age of a person.

4. The method of claim 1 further comprising modifying the first set of format parameters if errors are detected during the validation.

5. The method of claim 1 wherein the subset of the first plurality of data is validated for a desired transformation before the entire first plurality of data is transformed to the second format.

6. The method of claim 1 wherein the first plurality of data in the second format is stored in a data warehouse.

7. The method of claim 1 further comprising generating reports from the first plurality of data in the second format.

8. The method of claim 1 wherein the first portion of the pre-existing software instructions convert the first plurality of data into a flat file of commonized data before transforming the first plurality of data to a second format.

9. The method of claim 1, further comprising:
receiving a second plurality of data in a third format;
documenting a second set of format parameters for the third format;
accessing the set of pre-existing software instructions;
utilizing a second portion of the pre-existing software instructions to transform the second plurality of data to a fourth format, wherein the second portion is determined by the second set of format parameters; and
storing the second plurality of data in the fourth format.

10. The method of claim 1 wherein documenting the first set of format parameters for the first format comprises documenting a date format for the first plurality of data.

11. The method of claim 10 wherein the computer is connected to a network that can access the first plurality of data in the first format and also the pre-existing software instructions.

12. The method of claim 11 wherein the network is connected to the internet.

13. The method of claim 1 wherein the first plurality of data in the first format is received via a computer.

14. The method of claim 1 wherein the validation further comprises receiving a confirmation from a user that the first plurality of data has been properly transformed, where the user visually inspects a subset of the transformed first plurality of data.

15. The method of claim 1 further comprising utilizing the pre-existing software instructions to automatically generate software code that is used to transform the first plurality of data from the first format to the second format.

16. The method of claim 15 wherein documenting a first set of format parameters for the first format, utilizing a first portion of the pre-existing software instructions, and automatically generating software code are done concurrently.

17. The method of claim 1, further comprising generating documentation for a set of transformation rules used to transfer the first plurality of data from the first format to the second format.

18. The method of claim 17, wherein the documentation is in the form of a flowchart.

19. A system having a processor and memory storing executable instructions configured to:
receive a first plurality of data in a first format;
receive from a user a documentation of a first set of format parameters for the first format;
access a set of pre-existing software instructions;
utilize a first portion of the pre-existing software instructions to transform the first plurality of data to a second format, wherein the first portion of the pre-existing software instructions is selected based on the first set of format parameters;
validate a subset of the first plurality of data for a desired transformation from the first format to the second format;
modify the pre-existing software instructions if errors are detected during the validation; and
the first plurality of data transformed by the modified pre-existing software instruction in the second format.

20. The system of claim 19, wherein the system is configured to perform calculations with the first plurality of data in the first format before storing the first plurality of data in the second format.

21. The system of claim 19, wherein the system is configured to validate a desired transformation of a subset of the first plurality of data before transforming the data from the first format to the second format.

22. The system of claim 19, wherein the system is configured to utilize the pre-existing software instructions to automatically generate software code that is used to transform the first plurality of data from the first format to the second format.

23. The system of claim 22, wherein the system is configured to concurrently receive from a user a documentation of a first set of format parameters for the first format, access a set of pre-existing software instructions, and utilize the pre-existing software instructions to automatically generate software code that is used to transform the first plurality of data from the first format to the second format.

* * * * *

UNITED STATES PATENT AND TRADEMARK OFFICE
CERTIFICATE OF CORRECTION

| | |
|---|---|
| PATENT NO. | : 8,191,053 B2 |
| APPLICATION NO. | : 12/027622 |
| DATED | : May 29, 2012 |
| INVENTOR(S) | : Nancy Grimaldi et al. |

It is certified that error appears in the above-identified patent and that said Letters Patent is hereby corrected as shown below:

In claim 19, column 8, line 19, delete "the first plurality" and insert
--store the first plurality-- therefor.

Signed and Sealed this
Seventh Day of August, 2012

David J. Kappos
*Director of the United States Patent and Trademark Office*